US011900480B2

(12) United States Patent
Figueredo de Santana et al.

(10) Patent No.: US 11,900,480 B2
(45) Date of Patent: Feb. 13, 2024

(54) MEDIATING BETWEEN SOCIAL NETWORKS AND PAYED CURATED CONTENT PRODUCERS IN MISINFORMATIVE CONTENT MITIGATION

(71) Applicant: International Business Machines Corporation, Armonk, NY (US)

(72) Inventors: Vagner Figueredo de Santana, São Paulo (BR); Marisa Affonso Vasconcelos, São Paulo (BR); Mauro Carlos Pichiliani, São Paulo (BR); Heloisa Caroline de Souza Pereira Candello, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/069,861

(22) Filed: Oct. 14, 2020

(65) Prior Publication Data
US 2022/0114678 A1    Apr. 14, 2022

(51) Int. Cl.
*G06Q 10/00*  (2023.01)
*G06Q 50/00*  (2012.01)
(Continued)

(52) U.S. Cl.
CPC .......... *G06Q 50/01* (2013.01); *G06F 16/9536* (2019.01); *G06Q 20/1235* (2013.01); *G06Q 30/0185* (2013.01); *G06Q 30/0202* (2013.01)

(58) Field of Classification Search
CPC ................................................... G06Q 10/10
See application file for complete search history.

(56) References Cited

U.S. PATENT DOCUMENTS 7,729,954 B2   6/2010   Frederick
8,423,424 B2   4/2013   Myslinski
(Continued)

FOREIGN PATENT DOCUMENTS

KR   102135074 B1   7/2020
WO   2020061578 A1  3/2020

OTHER PUBLICATIONS

Manolis Chalkiadakis, Alexandros Kornilakis, Panagiotis Papadopoulos, Evangelos Markatos, and Nicolas Kourtellis. The Rise and Fall of Fake News sites: A Traffic Analysis. In Proceedings of the 13th ACM Web Science Conference 2021 (WebSci '21). Association for Computing Machinery, New York, NY.2021 (Year: 2021).*

(Continued)

*Primary Examiner* — Hafiz A Kassim
*Assistant Examiner* — Zahra Elkassabgi
(74) *Attorney, Agent, or Firm* — Edward P. Li

(57) ABSTRACT

A computer-implemented method, a computer program product, and a computer system for misinformative content mitigation. A computer receives from a social network system a request for curated content, where the curated content is related to misinformative content that has been identified by the social network system. The computer sends to a system of a paid curated content producer a request for making the curated content public. In response to that the system of the paid curated content producer accepts the request for making the curated content public, the computer provides to the social network system a link to the curated content on the system of the paid curated content producer. On the social network system, the misinformative content is flagged and the link to the curated content is presented aside the misinformative content.

15 Claims, 5 Drawing Sheets

(51) Int. Cl.
  *G06Q 30/018* (2023.01)
  *G06F 16/9536* (2019.01)
  *G06Q 30/0202* (2023.01)
  *G06Q 20/12* (2012.01)

(56) References Cited

U.S. PATENT DOCUMENTS

| | | | |
|---|---|---|---|
| 8,543,490 | B2 | 9/2013 | Lerner |
| 9,015,037 | B2 | 4/2015 | Myslinski |
| 9,477,818 | B1 * | 10/2016 | James .................. G06F 21/6209 |
| 9,852,376 | B2 | 12/2017 | Donoho |
| 9,887,944 | B2 | 2/2018 | Chang |
| 10,062,091 | B1 | 8/2018 | Schwimmer |
| 2013/0066730 | A1 * | 3/2013 | Myslinski ............. H04L 51/063 707/723 |
| 2013/0091215 | A1 * | 4/2013 | Funk .................. H04N 21/4668 709/204 |
| 2014/0129331 | A1 | 5/2014 | Spivack |
| 2014/0164994 | A1 | 6/2014 | Myslinski |
| 2015/0293897 | A1 * | 10/2015 | Myslinski ............. G06F 3/0488 707/755 |
| 2016/0034712 | A1 * | 2/2016 | Patton .................... G06F 16/48 726/28 |
| 2018/0068350 | A1 | 3/2018 | Grosso |
| 2019/0179861 | A1 | 6/2019 | Goldenstein |

OTHER PUBLICATIONS

"Patents Act 1977: Combined Search Report under Section 17(5)(b) and Abbreviated Examination Report under Section 18(3)", Your ref: DP/P49665GB, Application No. GB2113828.4, dated Mar. 15, 2022, 7 pages.

"Red-Rated Sites With False Claims About the Coronavirus: 338 and Counting", NewGuard, Last printed Oct. 8, 2020, 1 pages, <https://www.newsguardtech.com/coronavirus-misinformation-tracking-center/>.

Bellamy, Jann, "Acupuncture and cupping for adult idiopathic scoliosis at the VA", Science-Based Medicine, Oct. 3, 2020, 2 pages, <https://sciencebasedmedicine.org/>.

Ivanova, Irina, "Facebook earnings call: Expects to sell $420 million of political ads next year", CBS News, Oct. 30, 2019, 4 pages, <https://www.cbsnews.com/news/facebook-earnings-call-political-ads-to-bring-in-350-million-this-year/>.

Kulshrestha, et al., "Search bias quantification: investigating political bias in social media and web search", Information Retrieval Journal, 2019, vol. 22, pp. 188-227, <https://link.springer.com/article/10.1007/s10791-018-9341-2>.

Leitao, et al., A Survey on User-Interface Design Strategies to Address Online Bias, CHI EA '18: Extended Abstracts of the 2018 CHI Conference on Human Factors in Computing Systems, Apr. 2018, Paper No. LBW084, pp. 1-6, <https://dl.acm.org/doi/10.1145/3170427.3188567>.

Lyons, Tessa, "Replacing Disputed Flags With Related Articles", Facebook, Dec. 20, 2017, 2 pages, <https://about.fb.com/news/2017/12/news-feed-fyi-updates-in-our-fight-against-misinformation/>.

Mell et al., "The NIST Definition of Cloud Computing", National Institute of Standards and Technology, Special Publication 800-145, Sep. 2011, 7 pages.

Olteanu, et al., "Social Data: Biases, Methodological Pitfalls, and Ethical Boundaries", Frontiers in Big Data 2:13, Dec. 20, 2016, 47 pages, <https://papers.ssrn.com/sol3/papers.cfm?abstract_id=2886526>.

Pomeroy, Ross, "The Best Sources for Updates and News on the Coronavirus", RealClearScience, Mar. 14, 2020, 1 page, <https://www.realclearscience.com/blog/2020/03/14/the_best_sources_for_updates_and_news_on_the_coronavirus.html>.

"Patents Act 1977: Examination Report under Section 18(3)", Your Reference: P202004585GB01, Application No. GB2113828.4, dated Aug. 26, 2022, 6 pages.

* cited by examiner

MEDIATING BETWEEN SOCIAL NETWORKS AND PAYED CURATED CONTENT PRODUCERS IN MISINFORMATIVE CONTENT MITIGATION

BACKGROUND

The present invention relates generally to misinformative content mitigation in social networks, and more particularly to misinformative content mitigation by mediating between social networks and paid curated content producers.

Besides all existing efforts for identifying biases in social networks and classification of content into misinformative content or misinformation shared in instant messaging applications, there is still need for preventing misinformative content or misinformation to viralize (or spread virally) in social networks. Often, curated content (or trusted content) that can counter against misinformative content is behind paywalls (access limitation provided by paid content producers after zero or more free accesses).

U.S. Pat. No. 9,852,376 (Donoho, 2015) teaches a method and apparatus for certification of facts; the method and apparatus introduce a certifier and a fact certificate into the fact-exchange cycle that enables parties to exchange trustworthy facts. U.S. patent Ser. No. 10/062,091 (Schwimmer, 2013) discloses systems and methods for allowing a website publisher to integrate a website's paywall system with the website's supplemental content server system. U.S. Pat. No. 8,423,424 (Myslinski, 2012) discloses a web page fact checking system that verifies the correctness of information and/or characterizes the information by comparing the information with one or more sources. US Pat. Pub. No. 20140164994 (Myslinski, 2013) discloses a fact checking system that automatically monitors, processes, fact checks information and indicates a status of the information, and the fact checking system is able to incorporate a graphical user interface with fact checking icons to indicate fact checking results. However, none of the above-mentioned disclosures provides a solution to mitigate misinformative content sharing by mediating between social networks and trusted sources producing curated content.

SUMMARY

In one aspect, a computer-implemented method for misinformative content mitigation is provided. The computer-implemented method includes receiving from a social network system a request for curated content, where the curated content is related to misinformative content that has been identified by the social network system. The computer-implemented method further includes sending to a system of a paid curated content producer a request for making the curated content public. The computer-implemented method further includes, in response to that the system of the paid curated content producer accepts the request for making the curated content public, providing to the social network system a link to the curated content on the system of the paid curated content producer. With the computer-implemented method, on the social network system, the misinformative content is flagged and the link to the curated content is presented aside the misinformative content.

The computer-implemented method further includes: identifying, by the social network system, the misinformative content; identifying, by the social network system, topics of the misinformative content; sending, by the social network system, the misinformative content, the topics, and network information of the social network system; and sending, by the social network system, the request for the curated content. In the computer-implemented method, the network information comprises at least one of graph topology metrics and characteristics of the social network system.

The computer-implemented method further includes predicting reach of the misinformative content, based on the topics and the network information. The computer-implemented method further includes retrieving the curated content from one or more systems of respective paid curated content producers. The computer-implemented method further includes ranking the one or more systems of the respective paid curated content producers, based on user preferences for the respective of paid curated content producers. The computer-implemented method further includes selecting, from the one or more systems of the respective paid curated content producers, the system of the paid curated content producer, based on ranking the one or more systems of the respective paid curated content producers.

The computer-implemented method further includes predicting a number of visits by users of the social network system to the curated content on the one or more systems of the respective paid curated content producers. The computer-implemented method further includes informing the system of the paid curated content producer of the number of visits, while sending the request for making the curated content public. In the computer-implemented method, based on the number of visits, the system of the paid curated content producer makes a decision on whether a paywall for the curated content is removed.

The computer-implemented method further includes, in response to that no curated content is available on the systems of the paid curated content producer, requesting the systems of the paid curated content producer to create the curated content to refute the misinformative content.

In another aspect, a computer program product for misinformative content mitigation is provided. The computer program product comprises a computer readable storage medium having program instructions embodied therewith, and the program instructions are executable by one or more processors. The program instructions are executable to: receive, from a social network system, a request for curated content, where the curated content is related to misinformative content that has been identified by the social network system; send to a system of a paid curated content producer a request for making the curated content public; in response to that the system of the paid curated content producer accepts the request for making the curated content public, provide to the social network system a link to the curated content on the system of the paid curated content producer; where, on the social network system, the misinformative content is flagged and the link to the curated content is presented aside the misinformative content.

In the computer program product, the program instructions are further executable to identify, by the social network system, the misinformative content. In the computer program product, the program instructions are further executable to identify, by the social network system, topics of the misinformative content. In the computer program product, the program instructions are further executable to send, by the social network system, the misinformative content, the topics, and network information of the social network system, where the network information comprises at least one of graph topology metrics and characteristics of the social network system. In the computer program product, the program instructions are further executable to send, by the social network system, the request for the curated content.

In the computer program product, the program instructions are further executable to: predict reach of the misinformative content, based on the topics and the network information; retrieve, from one or more systems of respective paid curated content producers, the curated content; rank the one or more systems of the respective paid curated content producers, based on user preferences for the respective of paid curated content producers; and select, from the one or more systems of the respective paid curated content producers, the system of the paid curated content producer, based on ranking the one or more systems of the respective paid curated content producers.

In the computer program product, the program instructions are further executable to: predict a number of visits by users of the social network system to the curated content on the one or more systems of the respective paid curated content producers; inform the system of the paid curated content producer of the number of visits, while sending the request for making the curated content public. Based on the number of visits, the system of the paid curated content producer makes a decision on whether a paywall for the curated content is removed.

In the computer program product, the program instructions are further executable to, in response to that no curated content is available on the system of the paid curated content producer, request the systems of the paid curated content producer to create the curated content to refute the misinformative content.

In yet another aspect, a computer system for misinformative content mitigation is provided. The computer system comprises one or more processors, one or more computer readable tangible storage devices, and program instructions stored on at least one of the one or more computer readable tangible storage devices for execution by at least one of the one or more processors. The program instructions are executable to receive, from a social network system, a request for curated content, where the curated content is related to misinformative content that has been identified by the social network system. The program instructions are further executable to send to a system of a paid curated content producer a request for making the curated content public. In response to that the system of the paid curated content producer accepts the request for making the curated content public, the program instructions are further executable to provide to the social network system a link to the curated content on the system of the paid curated content producer. On the social network system, the misinformative content is flagged and the link to the curated content is presented aside the misinformative content.

In the computer system, the program instructions are further executable to: identify, by the social network system, the misinformative content; identify, by the social network system, topics of the misinformative content; send, by the social network system, the misinformative content, the topics, and network information of the social network system; and send, by the social network system, the request for the curated content. The network information comprises at least one of graph topology metrics and characteristics of the social network system.

In the computer system, the program instructions are further executable to predict reach of the misinformative content, based on the topics and the network information. In the computer system, the program instructions are further executable to retrieve, from one or more systems of respective paid curated content producers, the curated content. In the computer system, the program instructions are further executable to rank the one or more systems of the respective paid curated content producers, based on user preferences for the respective of paid curated content producers. In the computer system, the program instructions are further executable to select, from the one or more systems of the respective paid curated content producers, the system of the paid curated content producer, based on the ranking the one or more systems of the respective paid curated content producers.

In the computer system, the program instructions are further executable to predict a number of visits by users of the social network system to the curated content on the one or more systems of the respective paid curated content producers. In the computer system, the program instructions are further executable to inform the system of the paid curated content producer of the number of visits, while sending the request for making the curated content public. In the computer system, based on the number of visits, the system of the paid curated content producer makes a decision on whether a paywall for the curated content is removed.

In the computer system, in response to that no curated content is available on the system of the paid curated content producer, the program instructions are further executable to request the systems of the paid curated content producer to create the curated content to refute the misinformative content.

DETAILED DESCRIPTION

Embodiments of the present invention disclose a technology that bridges social networks (where misinformative content can viralize or spread virally) and curated content producers (where misinformative content can be contrasted with). In the embodiments of the present invention, a system mediates between social network systems and trusted sources or curated content producers to mitigate misinformative content sharing. The goal of the system is to enable free access to curated content (often behind paywalls) that can prevent the misinformative content (with potential to be viral) from spreading. The present invention provides a solution that controls the handshake between social network systems and trusted resources, providing the benefit to social network systems for preventing misinformative content from spreading and resulting in engagement and/or visualizations for trusted resources (often related to advertisement and reputation or image rewards) which will be impossible to obtain without the access flow coming from social network systems. The disclosed technology in the embodiments of the present invention considers multiple components for (1) crawling content needed by social network systems and available at trusted resources, (2) computing viralization (or virial spread) factor of misinformative content based on social network systems graph topology, and (3) converting the engagement or views potential to be generated for trusted resources when opening the identified curated content.

The present invention proposes a way of benefiting both ends—social network systems and trusted resources. The proposed system identifies misinformative content. The proposed system identifies the potential of the misinformative content to viralize and the need for curated content that trusted resources offer. In the proposed system, trusted resource remove paywall controls on the curated content, and social network system recommend or show the curated content aside the misinformative content classified as misinformative. Thus, users of social network systems have opportunities to access curated, trusted content prior to sharing misinformative content with high potential to viralize or spread virally.

Figure 1:
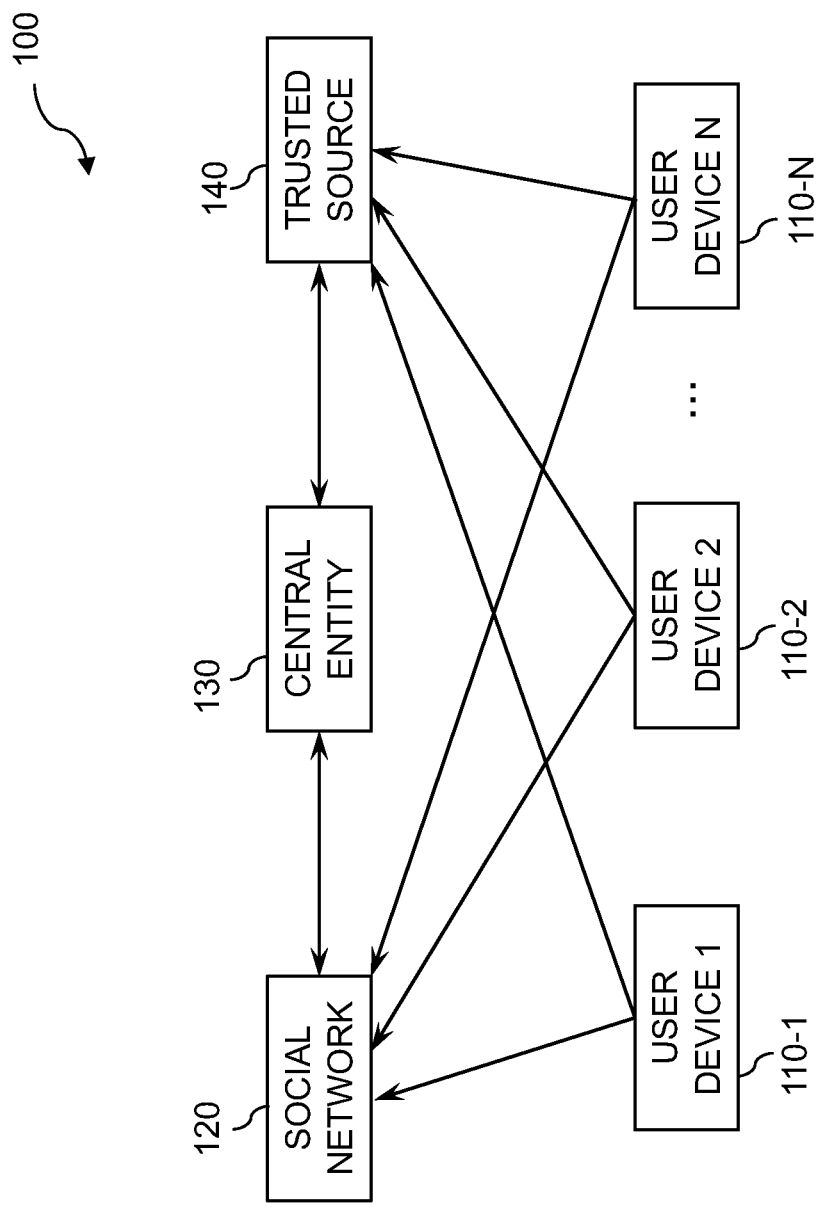
FIG. 1 is a systematic diagram illustrating a system of mediating between social networks and paid curated content producers in misinformative content mitigation, in accordance with one embodiment of the present invention.

FIG. 1 is a systematic diagram illustrating system 100 of mediating between social networks and paid curated content producers in misinformative content mitigation, in accordance with one embodiment of the present invention. System 100 includes a plurality of user devices (110-1, 110-2, . . . , and 110-N). System 100 further includes social network system 120, central entity 130, and trusted source or system of paid curated content producer 140.

A respective one of user devices (110-1, 110-2, . . . , and 110-N) may be a computing device, for example a desktop computer and a mobile device. A respective one of user devices (110-1, 110-2, . . . , and 110-N) may be any electronic device or computing system capable of receiving input from a user, executing computer program instructions, and communicating with another computing system via a network. The computing device is described in more detail in later paragraphs with reference to FIG. 3.

Social network system 120, central entity 130, or trusted source 140 may reside on a computing device or a server. In another embodiment, social network system 120, central entity 130, or trusted source 140 may reside on a virtual machine or another virtualization implementation. The virtual machine or the virtualization implementation runs on a computing device. The computing device is described in more detail in later paragraphs with reference to FIG. 3.

System 100 may be implemented in a network that can be any combination of connections and protocols which support communications among user devices (110-1, 110-2, . . . , and 110-N), social network system 120, central entity 130, and trusted source 140. For example, the network may be the Internet which represents a worldwide collection of networks and gateways to support communications between devices connected to the Internet; the network may be implemented as an intranet, a local area network (LAN), a wide area network (WAN), and a wireless network. System 100 may be implemented in a cloud computing environment. Later paragraphs with reference to FIG. 4 and FIG. 5 describe the cloud computing environment in detail.

It should be appreciated that FIG. 1 provides only an illustration of an system of mediating between social networks and paid curated content producer in misinformative content mitigation. FIG. 1 illustrates an embodiment of the system with one social network system and one trusted source. It should be appreciated that the system may have one or more social network system and one or more trusted sources. It should be appreciated that the one or more social network system may reside on different computing devices or servers and the one or more trusted sources may also reside on different computing devices or servers.

Users of social network system 120 use user devices (110-1, 110-2, . . . , and 110-N) to access content on social network system 120. Some of the content on social network system 120 may be misinformative. Social network system 120 includes a misinformative content classifier for identifying misinformative content on social network system 120. Social network system 120 sends to central entity 130 a request for curated, trusted content. The curated, trusted content is often behind paywalls on trusted source 140. With the request, social network system 120 sends the identified misinformative content, topics of the misinformative content, and network information such as social network system topology.

Central entity 130 receives the request for the curated, trusted content. Central entity 130 includes a module for viralization assessment or computing viralization factor, based on the topics of the misinformative content and social network system topology; thus, central entity 130 can predict reach of the misinformative content. Central entity 130 further includes a crawler crawling the curated, trusted content that is requested by social network system 120 and available on trusted source 140. Central entity 130 further includes a module for engagement prediction (user access flow from social network system 120 to trusted source 140) or predicting a number of visits by the uses of social network system 120 to the curated content on trusted source 140.

To speed up crawling processes on social network system 120, a configuration file is placed in a root directory on social network system 120. For example, the configuration file on social network system 120 may be a public text file or JavaScript Object Notation (JSON) file. The configuration file includes a list of the misinformative content. Each record in the configuration file may include a Uniform Resource Locator (URL) of the misinformative content and the topics for the misinformative content presented in the URL. Similarly, a configuration file is placed in a root directory of crawling processes on trusted source (system of paid curated content producer) 140. For example, the configuration file on trusted source (system of paid curated content producer) 140 may be a public text file or JavaScript Object Notation (JSON) file. The configuration file includes a list of the curated content. Each record in the configuration file may include a Uniform Resource Locator (URL) of the curated content and the topics for the curated content presented in the URL. The configuration file on social network system 120 or trusted source (system of paid curated content producer) 140 allows the crawler on central entity 130 to timely perform analysis, prior to the misinformative content to viralize (or spread virally).

Central entity 130 mediates social network system 120 and trusted source 140. Central entity 130 sends the engagement prediction to trusted source 140 and sends to trusted source 140 a request for removing paywalls or making the curated, trusted content public.

Trusted source 140 includes a paywall controller. Receiving the request for removing paywalls from central entity 130, trusted source 140 determines whether the request for removing paywalls is accepted. In response to determining that the request is accepted, the paywall controller of trusted source 140 removes the paywalls for the curated, trusted content.

On social network system 120, central entity 130 suggests the users a link to trusted source 140 that provides the curated, trusted content. On social network system 120, the misinformative content is flagged and a link to the curated, trusted content is added aside the misinformative content. Through the mediation by central entity 130 between social network system 120 and trusted source 140, the users of social network system 120 have access to the curated, trusted content, avoiding the paywalls on trusted source 140. When the user uses user devices (110-1, 110-2, . . . , and 110-N) to access to curated, trusted content (related to the misinformative content), personal points of view and opinions about the topic are enriched, thus mitigating misinformative content sharing.

Figure 2:
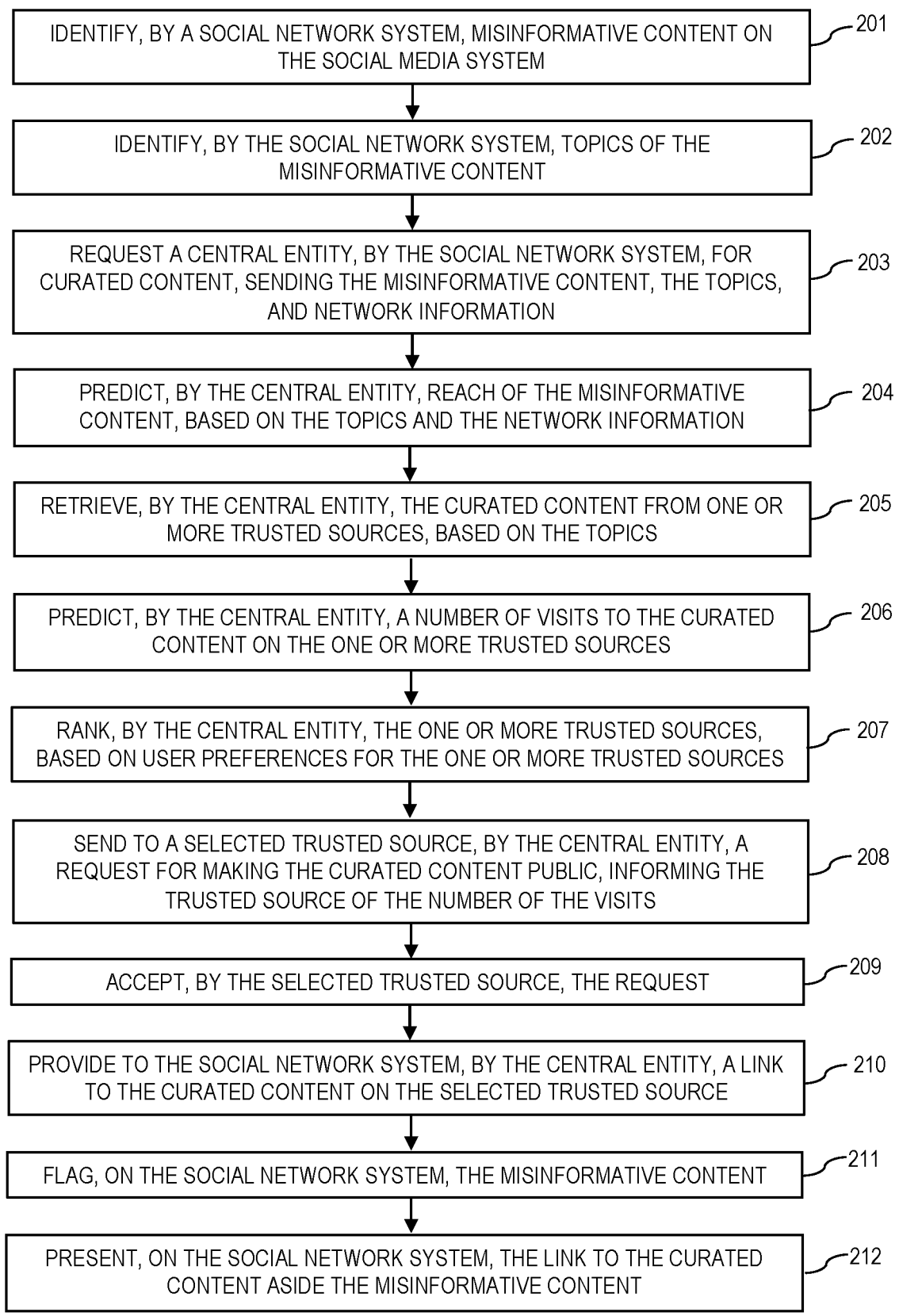
FIG. 2 presents a flowchart showing operational steps of mediating between social networks and paid curated content producers in misinformative content mitigation, in accordance with one embodiment of the present invention.

FIG. 2 presents a flowchart showing operational steps of mediating between social networks and paid curated content producers in misinformative content mitigation, in accordance with one embodiment of the present invention. The operational steps are implemented by one or more processors on one or more computing devices or servers.

At step 201, a social network system (such as social network system 120 in the embodiment shown in FIG. 1) identifies misinformative content on the social network system. The misinformative content may be misinformation shared in instant messaging applications of users of the social network system. The content (e.g., image, text, audio, and video in posts) shared on social network system are submitted to a misinformative content classifier on the social network system. In response to that there is high confidence (threshold of certainty) of the content being misinformative, the misinformative content classifier internally flags the content as misinformative.

At step 202, the social network system identifies topics of the misinformative content. Using natural language processing (NLP) methods, the social network system extracts the topics of the investigated misinformative content for further identification on external websites. The topics will be used to better identify subjects of terms of the misinformative content.

At step 203, the social network system requests a central entity (such as central entity 130 in the embodiment shown in FIG. 1) for curated content. In sending a request for the curated content, the social network system sends to the central entity the misinformative content (identified at step 201), the topics (identified at step 202), and network information of the social network system. The network information includes but not limited to graph topology metrics or characteristics (e.g., average degree, diameter, betweenness, and closeness).

The central entity receives from the social network system the request for the curated content. At step 204, the central entity predicts reach of the misinformative content, based on the topics and the network information provided by the social network system. Using engagement information (e.g., a number of likes and/or a number of views) provided by the social network system and the graph topology or network metrics (e.g., influence, centrality), the central entity computes the reach of the investigated misinformative content.

At step 205, the central entity retrieves the curated content from one or more trusted sources (or one or more systems of respective paid curated content producers), based on the topics. Trusted source 140 in the embodiment shown in FIG. 1 is one of the one or more trusted sources. The curated content that is requested by the social network system is available on the one or more trusted sources. The central entity requests the trusted sources for documents that can refute or confirm the topics sent by the social network system.

At step 206, the central entity predicts a number of visits by the users of the social network system to the curated content on the trusted sources. To predict the number of visits to the curated content, the central entity computes metrics of conversion (e.g., click through rate), based on the history of accesses to similar curated content by the users of the social network system. At step 207, the central entity ranks the one or more trusted sources, based on preferences of the users for the trusted sources.

Based on ranking of the one or more trusted sources, the central entity chooses a selected trusted source from the one or more trusted sources. At step 208, the central entity sends to the selected trusted source a request for making the curated content public (or removing a paywall for the curated content). The central entity also informs the selected trusted source of the number of the visits to the curated content on the trusted source by the users of the social network system. The central entity negotiates access to curated content on the selected trusted source, by providing the information on the potential audience coming from the social network system.

Based on the information provided by the central entity, the selected trusted source makes a decision on whether a paywall for the curated content is removed. At step 209, the selected trusted source accepts the request for making the curated content public. The selected trusted source informs the central entity that the paywall of the requested curated content is removed and hence the requested curated content can be presented or recommended aside the identified misinformative content. If the selected trusted source rejects the request for making the curated content public, the curated content remains controlled by the paywall of the selected trusted source; the central entity finds a new selected trusted source, until the request for making the curated content public is accepted by one of the one more trusted source.

At step 210, the central entity provides to the social network system a link to the curated content on the selected trusted source. For example, the central entity provides to the social network system a Uniform Resource Locator (URL) of the curated content on the selected trusted source. At step 211, the social network system flags the misinformative content. At step 212, the social network system presents the link to the curated content on the selected trusted source, aside the misinformative content.

In other embodiments, in response to that none of the one or more trusted sources has results for a query of the central entity, the central entity searches and then crawls the Web for results related to the original query. In yet other embodiments, in response to that none of the one or more trusted sources has results for a query of the central entity, the central entity requests the one or more trusted sources to create the curated content to refute or confirm the misinformative content.

Figure 3:
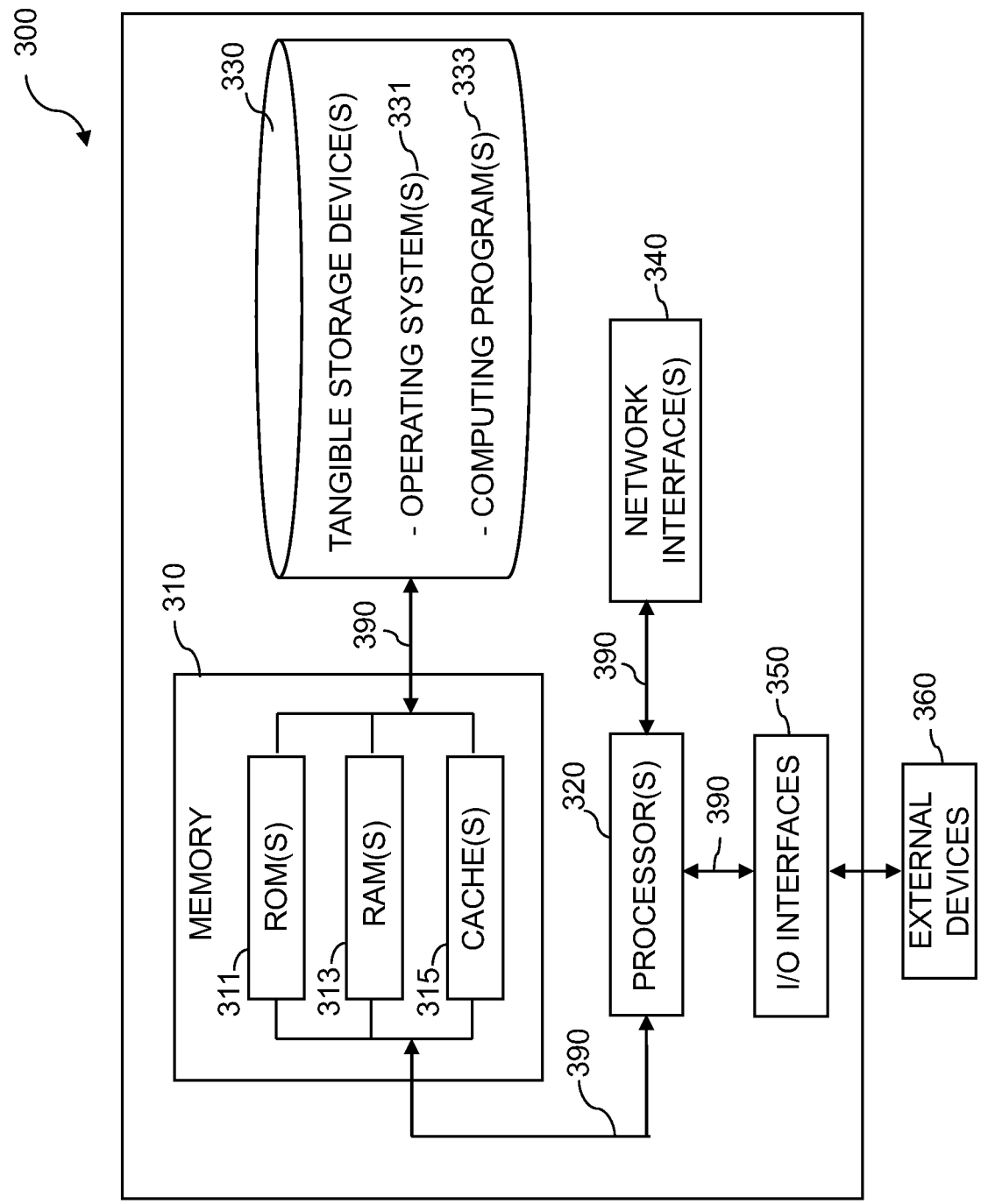
FIG. 3 is a diagram illustrating components of a computing device, in accordance with one embodiment of the present invention.

FIG. 3 is a diagram illustrating components of a computing device or server, in accordance with one embodiment of the present invention. It should be appreciated that FIG. 3 provides only an illustration of one implementation and does not imply any limitations with regard to the environment in which different embodiments may be implemented.

Referring to FIG. 3, computing device or server 300 includes processor(s) 320, memory 310, and tangible storage device(s) 330. In FIG. 3, communications among the above-mentioned components of computing device or server 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330.

Computing device or server 300 further includes I/O interface(s) 350. I/O interface(s) 350 allows for input and output of data with external device(s) 360 that may be connected to computing device or server 300. Computing device or server 300 further includes network interface(s) 340 for communications between computing device or server 300 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
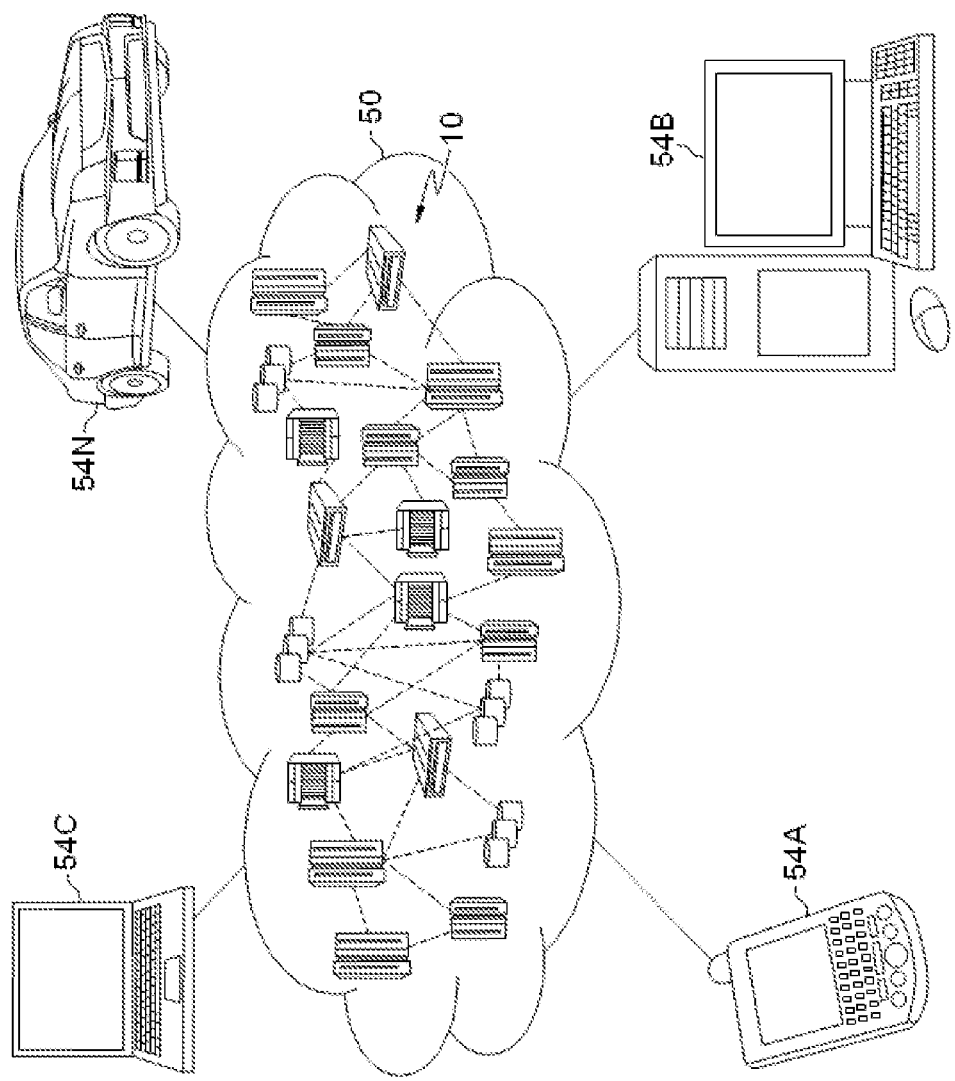
FIG. 4 depicts a cloud computing environment, in accordance with one embodiment of the present invention.

Referring now to FIG. 4, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 5:
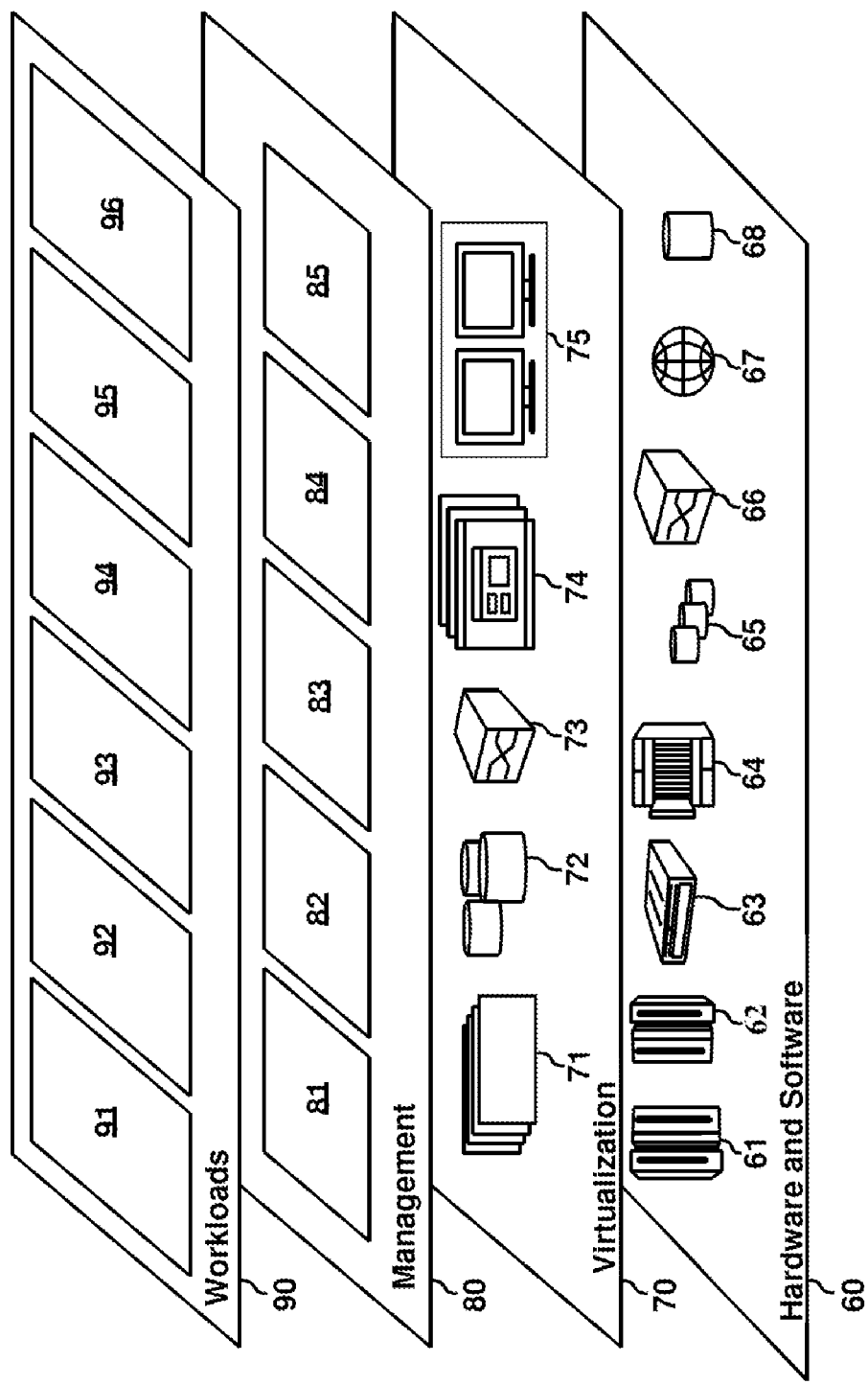
FIG. 5 depicts abstraction model layers in a cloud computing environment, in accordance with one embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of mediating between social networks and paid curated content producer in misinformative content mitigation in a cloud computing environment.

What is claimed is:

1. A computer-implemented method for mediating between social networks and paid curated content producers, the method comprising:
   receiving, by a first computer mediating between a second computer hosting a social network and a third computer hosting a system of a paid curated content producer, from the second computer, a request for removing a paywall of curated content on the third computer, wherein the curated content is to be used to refute misinformative content that has been identified by the second computer;
   predicting, by the first computer, a number of visits to the curated content by users of the social network, based on a history of accesses to similar curated content by the users of the social network;
   sending to the third computer, by the first computer, the request for removing the paywall of the curated content;
   sending to the third computer, by the first computer, information about the number of the visits, wherein, based on the information, the third computer determines whether to remove the paywall;
   receiving from the third computer, by the first computer, a notification that the third computer removes the paywall of the curated content;
   providing to the second computer, by the first computer, a link for accessing the curated content without the paywall on the third computer; and
   wherein the second computer flags the misinformative content and presents the link for accessing the curated content aside the misinformative content.

2. The computer-implemented method of claim 1, further comprising:
   identifying, by the second computer, the misinformative content;
   identifying, by the second computer, topics of the misinformative content;
   sending to the first computer, by the second computer, the misinformative content, the topics, and network information of the social network; and
   sending to the first computer, by the second computer, the request for the curated content.

3. The computer-implemented method of claim 2, wherein the network information comprises at least one of graph topology metrics and characteristics of the social network.

4. The computer-implemented method of claim 2, further comprising:
   predicting, by the first computer, reach of the misinformative content, based on the topics and the network information;
   retrieving from one or more computers hosting one or more systems of respective paid curated content producers, by the first computer, the curated content;
   ranking, by the first computer, the one or more systems of the respective paid curated content producers, based on user preferences for the respective paid curated content producers; and
   selecting, by the first computer, from the one or more systems of the respective paid curated content producers, the system of the paid curated content producer, based on ranking the one or more systems of the respective paid curated content producers.

5. The computer-implemented method of claim 1, further comprising:
   in response to that no curated content is available on the third computer, requesting, by the first computer, the third computer to create the curated content to refute the misinformative content.

6. A computer program product for mediating between social networks and paid curated content producers, the computer program product comprising a computer readable storage medium having program instructions embodied therewith, the program instructions executable by one or more processors, the program instructions executable to:
   receive, by a first computer mediating between a second computer hosting a social network and a third computer hosting a system of a paid curated content producer, from the second computer, a request for removing a paywall of curated content on the third computer, wherein the curated content is to be used to refute misinformative content that has been identified by the second computer;
   predict, by the first computer, a number of visits to the curated content by users of the social network, based on a history of accesses to similar curated content by the users of the social network;
   send to the third computer, by the first computer, the request for removing the paywall of the curated content;
   send to the third computer, by the first computer, information about the number of the visits, wherein, based on the information, the third computer determines whether to remove the paywall;

receive from the third computer, by the first computer, a notification that the third computer removes the paywall of the curated content;

provide to the second computer, by the first computer, a link for accessing the curated content without the paywall on the third computer; and wherein the second computer flags the misinformative content and presents the link for accessing the curated content aside the misinformative content.

7. The computer program product of claim 6, further comprising the program instructions executable to:

identify, by the second computer, the misinformative content;

identify, by the second computer, topics of the misinformative content;

send to the first computer, by the second computer, the misinformative content, the topics, and network information of the social network system; and send to the first computer, by the second computer, the request for the curated content.

8. The computer program product of claim 7, wherein the network information comprises at least one of graph topology metrics and characteristics of the social network.

9. The computer program product of claim 7, further comprising the program instructions executable to:

predict, by the first computer, reach of the misinformative content, based on the topics and the network information;

retrieve from one or more computers hosting one or more systems of respective paid curated content producers, by the first computer, the curated content;

rank, by the first computer, the one or more systems of the respective paid curated content producers, based on user preferences for the respective paid curated content producers; and select, by the first computer, from the one or more systems of the respective paid curated content producers, the system of the paid curated content producer, based on ranking the one or more systems of the respective paid curated content producers.

10. The computer program product of claim 6, further comprising program instructions executable to:

in response to that no curated content is available on the third computer, request, by the first computer, the third computer to create the curated content to refute the misinformative content.

11. A computer system for mediating between social networks and paid curated content producers, the computer system comprising one or more processors, one or more computer readable tangible storage devices, and program instructions stored on at least one of the one or more computer readable tangible storage devices for execution by at least one of the one or more processors, the program instructions executable to:

receive, by a first computer mediating between a second computer hosting a social network and a third computer hosting a system of a paid curated content producer, from the second computer, a request for removing a paywall of curated content on the third computer, wherein the curated content is to be used to refute misinformative content that has been identified by the second computer;

predict, by the first computer, a number of visits to the curated content by users of the social network, based on a history of accesses to similar curated content by the users of the social network;

send to the third computer, by the first computer, the request for removing the paywall of the curated content;

send to the third computer, by the first computer, information about the number of the visits, wherein, based on the information, the third computer determines whether to remove the paywall;

receive from the third computer, by the first computer, a notification that the third computer removes the paywall of the curated content;

provide to the second computer, by the first computer, a link for accessing the curated content without the paywall on the third computer; and wherein the second computer flags the misinformative content and presents the link for accessing the curated content aside the misinformative content.

12. The computer system of claim 11, further comprising the program instructions executable to:

identify, by the second computer, the misinformative content;

identify, by the second computer, topics of the misinformative content;

send to the first computer, by the second computer, the misinformative content, the topics, and network information of the social network; and send to the first computer, by the second computer, the request for the curated content.

13. The computer system of claim 12, wherein the network information comprises at least one of graph topology metrics and characteristics of the social network.

14. The computer system of claim 12, further comprising the program instructions executable to:

predict, by the first computer, reach of the misinformative content, based on the topics and the network information;

retrieve from one or more computers hosting one or more systems of respective paid curated content producers, by the first computer, the curated content;

rank, by the first computer, the one or more systems of the respective paid curated content producers, based on user preferences for the respective paid curated content producers; and select, by the first computer, from the one or more systems of the respective paid curated content producers, the system of the paid curated content producer, based on ranking the one or more systems of the respective paid curated content producers.

15. The computer system of claim 11, further comprising program instructions executable to:

in response to that no curated content is available on the third computer, request, by the first computer, the third computer to create the curated content to refute the misinformative content.

* * * * *